United States Patent Office 3,515,219
Patented June 2, 1970

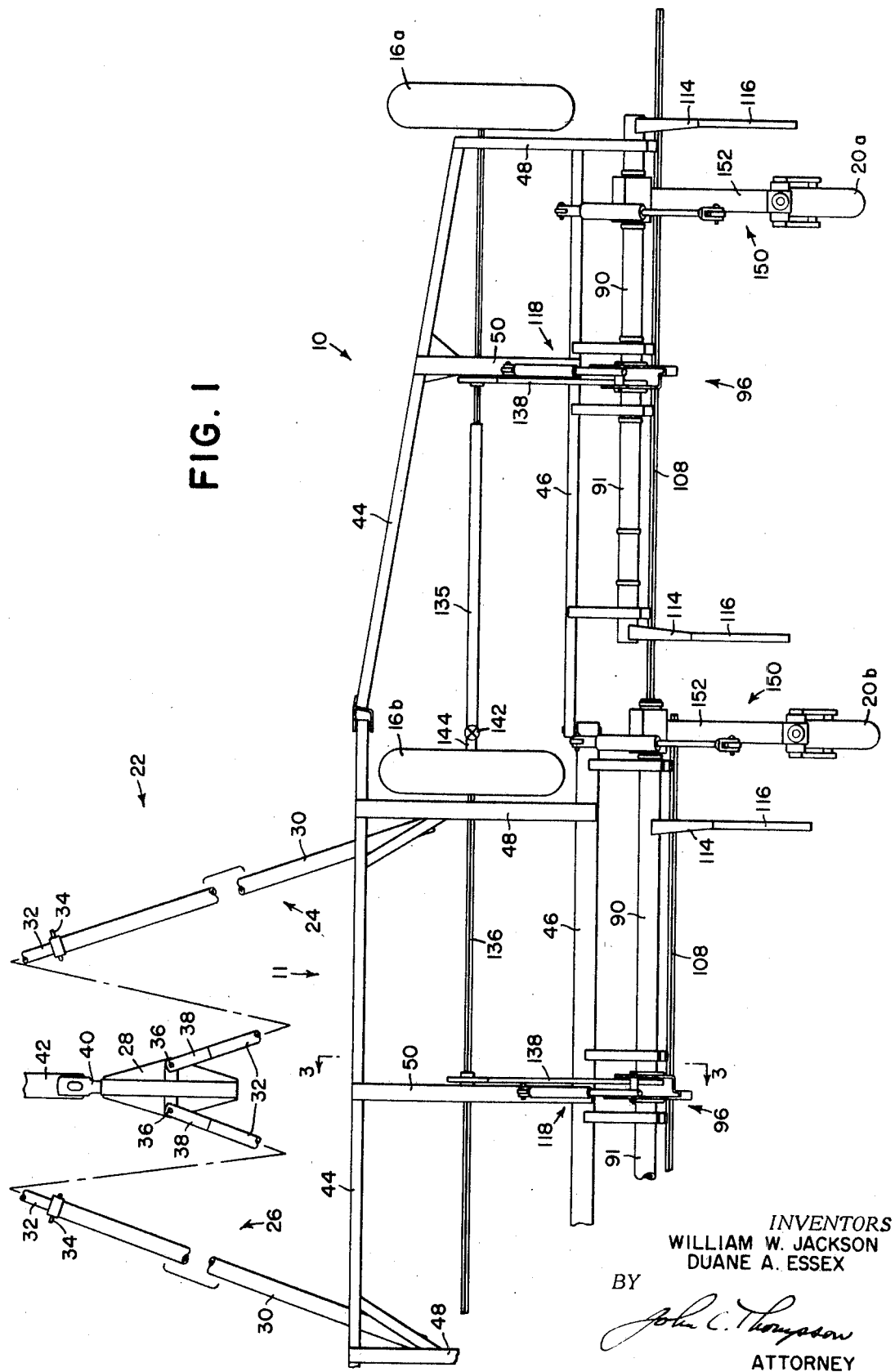

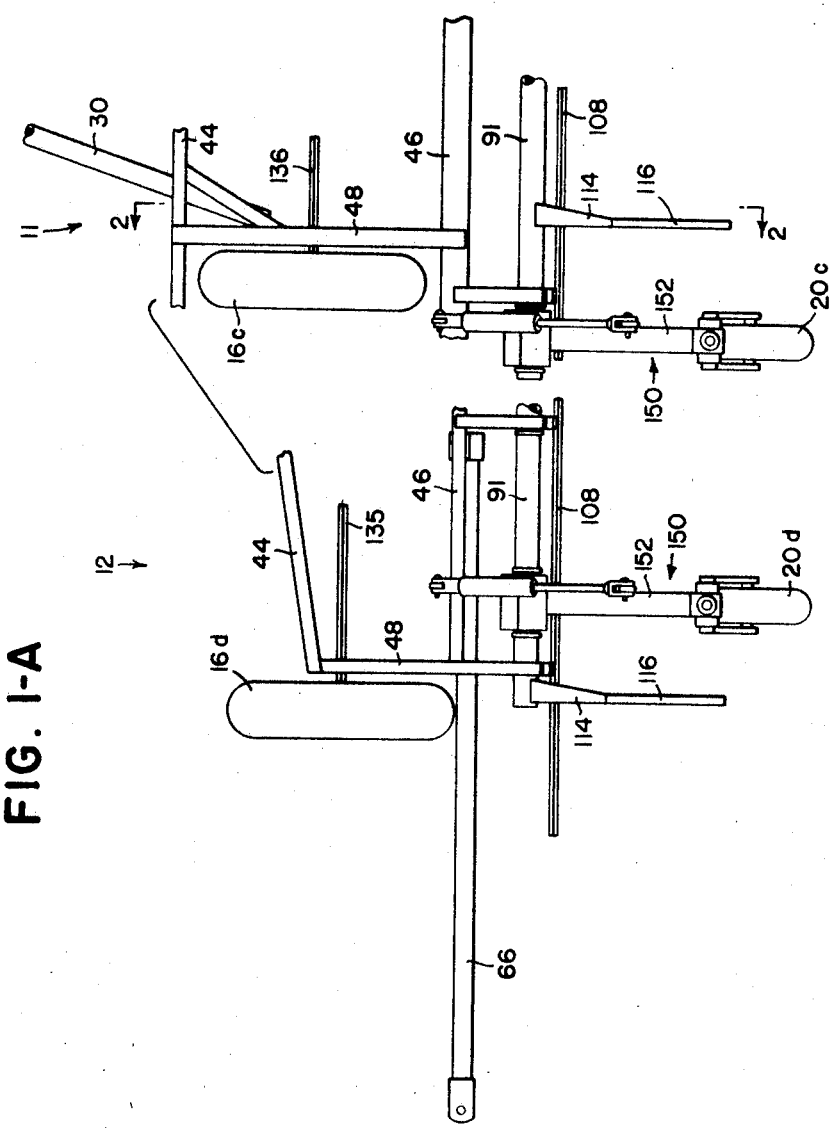

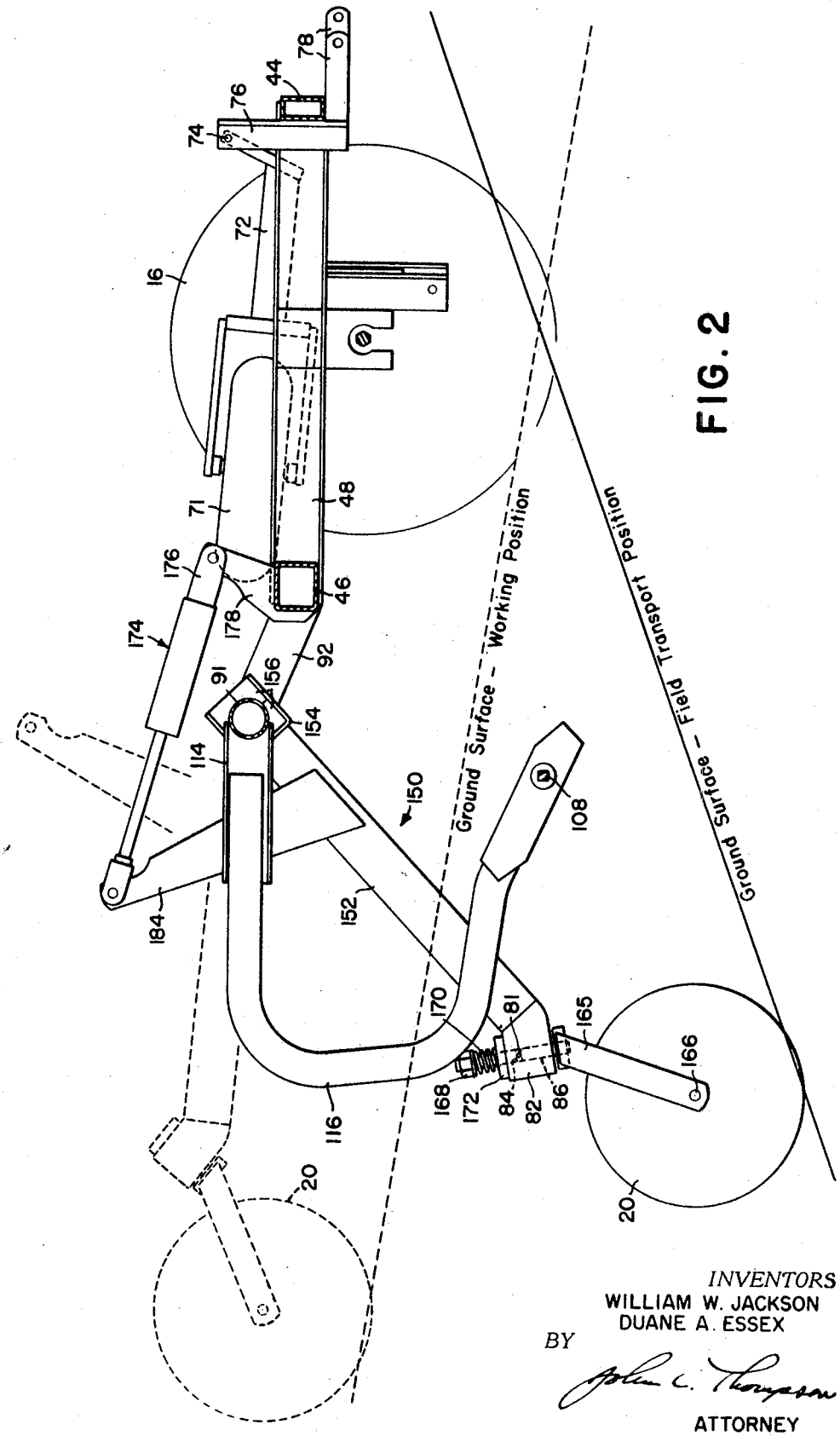

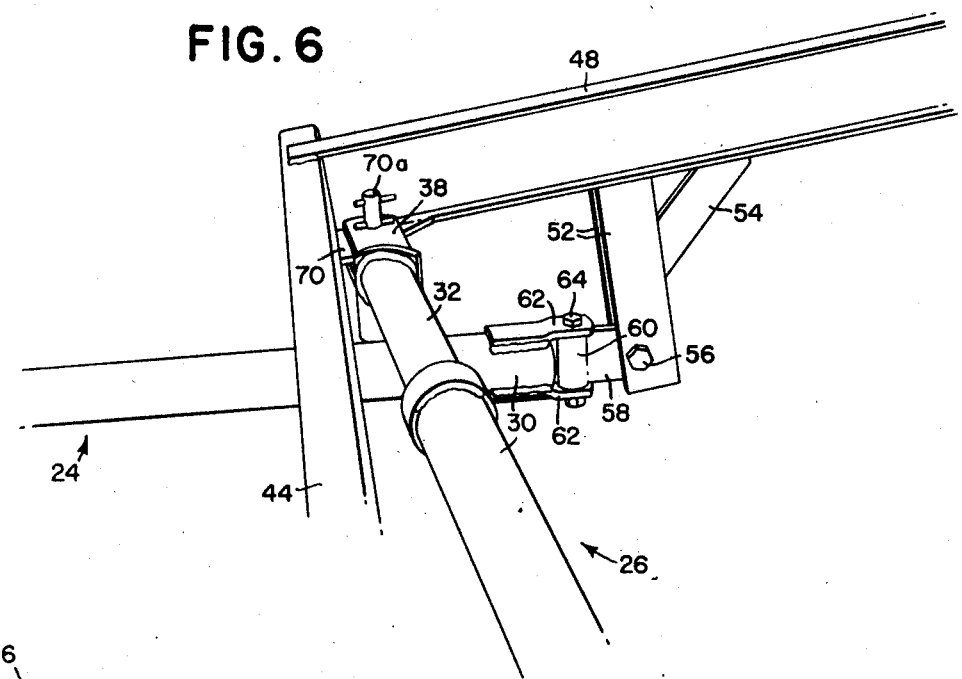
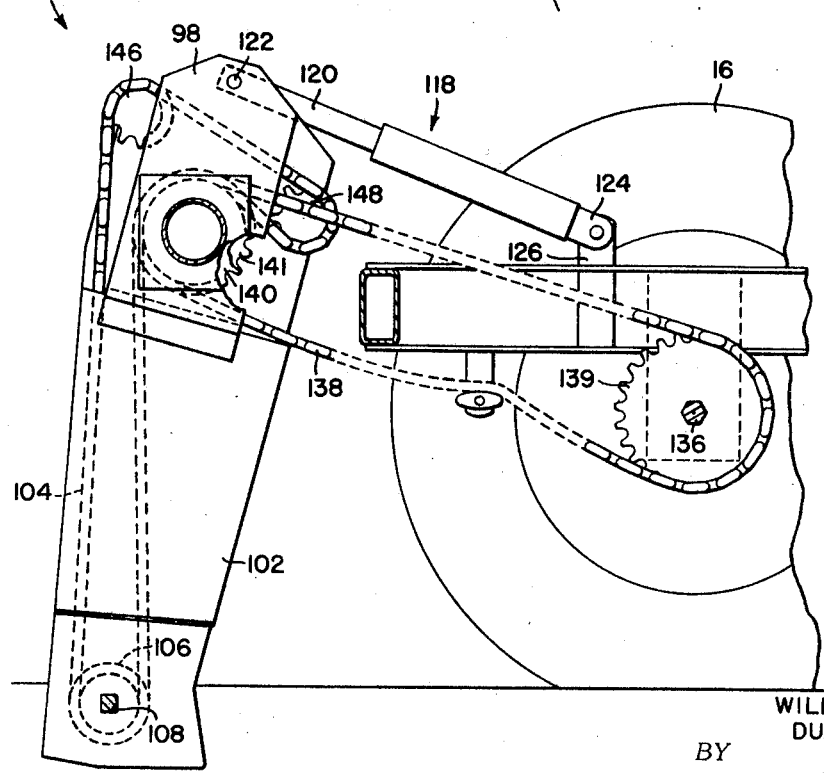

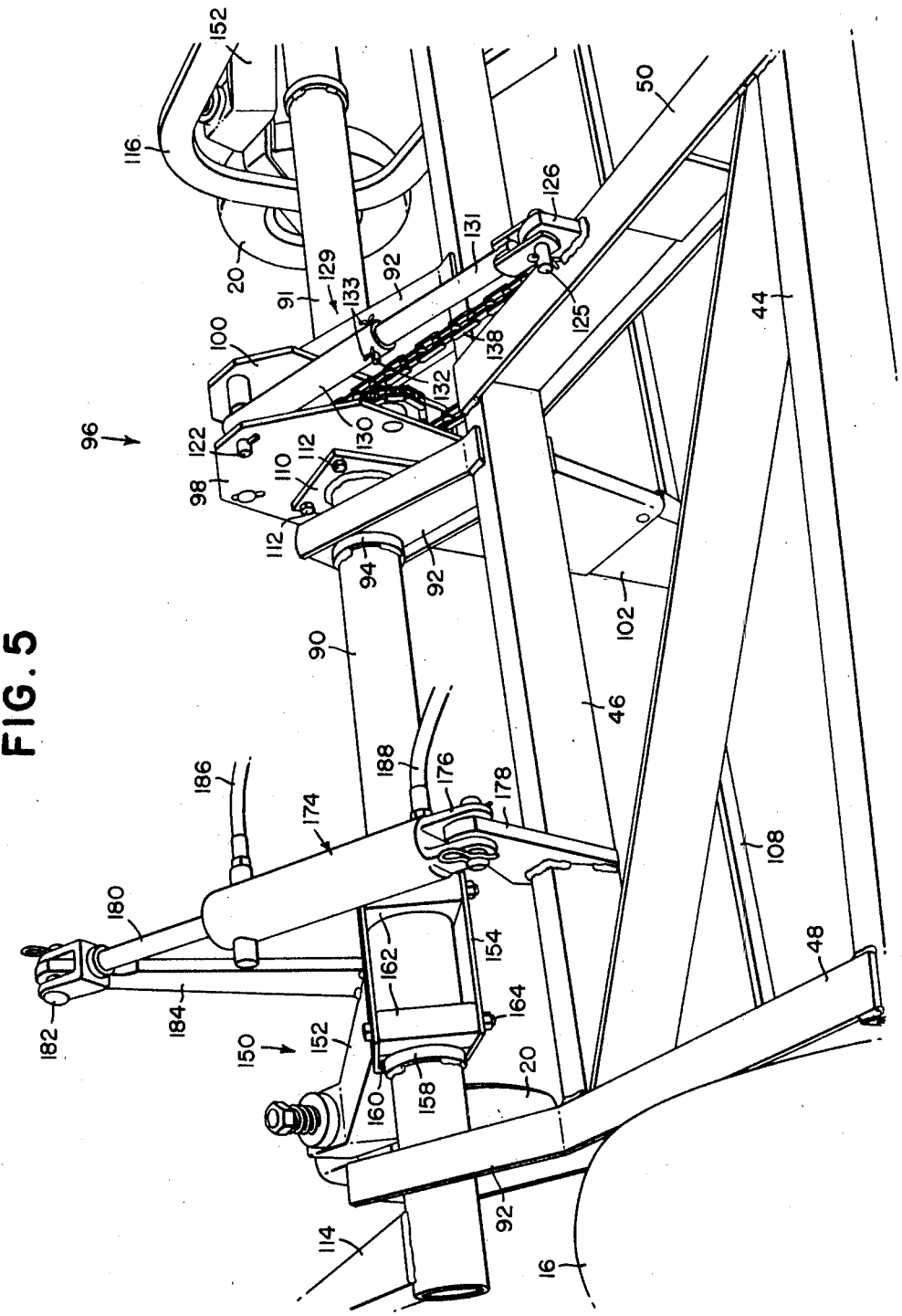

1

3,515,219
ROD WEEDER
William Wayne Jackson, Altoona, and Duane Arnold Essex, Des Moines, Iowa, assignors to Deere & Company, Moline, Ill., a corporation of Delaware
Filed Feb. 26, 1968, Ser. No. 708,096
Int. Cl. A01b 39/19
U.S. Cl. 172—44                 8 Claims

ABSTRACT OF THE DISCLOSURE

A flexible rod weeder having a plurality of subframes interconnected for swinging movement about longitudinally extending axes, each subframe carrying a weeder rod mounted on a rockshaft which is in turn mounted for yieldable rotational movement on the subframe. The rod weeder can be transported in an endwise position by folding the implement hitch and positioning rear gauge wheels and forward transport wheels in their transport position. The gauge wheels are carried by structure rotatably mounted about the rockshaft and can be raised and lowered by a hydraulic cylinder mounted between the frame and the upper end of the structure.

FIELD OF THE INVENTION

The present invention relates generally to agricultural implements, and more particularly to rod weeders and the like having a foldable implement hitch and a ground-working tool which is mounted for yieldable rearward and upward swinging movement to prevent damage to the tool should an obstruction be encountered when the earth-working tool is in the ground.

DESCRIPTION OF THE PRIOR ART

In order to fully utilize the available horsepower in today's modern farm tractors, it has become common practice to build implements of greater width and to drive them through the fields at higher speeds. Two basic problems are present in these implements, namely the problem of transporting the implements over highways, and damage occurring to the ground-working tools when working at high speeds.

One solution to the transporting problem has been to provide the implement with a removable or foldable hitch which is secured to the conventional farm tractor when working in the field, and a further hitch at one end of the implement which can be secured to the tractor so that the tractor can pull the implement endwise down a highway. One example of this form of hitch arrangement is shown in the Calkins et al. Pat. 3,288,480 issued Nov. 29, 1966. In this design, the implement is carried by a frame supported by vertically movable gauge wheels, the frame in turn being secured to a tractor by foldable draft links which are carried for swinging movement by king pins on the frame. To transport this device, it is only necessary to fold the principal implement hitch and position a rear transport wheel in its highway transport position and reposition the gauge wheels in their highway transport position, the tractor being then secured to a transport hitch at one end of the frame. While this design has been generally satisfactory for highway transportation, it has not been entirely satisfactory for field operations. Thus, if the land is rolling, uniform working depth cannot be maintained since the forward end of the implement will move up or down as the tractor moves up or down.

U.S. Pats. 3,135,337 and 3,135,338 issued June 2, 1964 to G. H. Morris disclose a manner in which a weeder rod can be mounted for upward and rearward swinging movement. This construction will prevent or materially reduce

2 damage to weeder rods should they encounter an obstruction during normal operation. These designs are not entirely satisfactory, however, since it is necessary to interconnect the standards that carry the weeder rods with the springs by a plurality of links. A further disadvantage of this design is that trash clearance is reduced. A still further disadvantage of this design is that springs are not entirely satisfactory since the springs will become fatigued, initially reducing the force required to swing the standards rearwardly, and eventually causing the springs to break.

SUMMARY OF THE INVENTION

It is the principal object of this invention to provide a relatively wide rod weeder which can be easily transported, the rod weeder having yieldably mounted weeder rods to prevent damage to the weeder rods during high speed operation of the rod weeder.

It is a further object of this invention to provide a rod weeder having a frame supported during ground-working operations by the front and rear wheel means, the frame being interconnected to a tractor by foldable hitch means which are connected to the frame for movement about vertical and transversely extending axes, the frame also being provided with an end hitch so that the rod weeder can be transported endwise.

It is a further object of this invention to provide a rod weeder having a weeder rod mounted for upward and rearward swinging movement, the weeder rod being normally held in its ground-working position by an extensible and retractable hydraulic cylinder.

It is a further object of the present invention to provide a rod weeder having a weeder rod mounted for yieldable upward and rearward swinging movement, in which there is relatively high trash clearance.

It is a still further object of the present invention to provide a rod weeder having a frame to which is rotatably secured a transversely extending rockshaft, the rockshaft having rigidly secured thereto depending standards or pendants and drive boots for a weeder rod, there being additional supports rotatably journaled about the rockshaft, said supports in turn carrying vertically movable gauge wheels, there being an extensible and retractable hydraulic cylinder mounted between the frame and the upper end of said structure for vertically positioning the gauge wheel.

Another object of this invention is to provide a rod weeder of high durability, which is designed for ease in operation in the field and which can rapidly be converted from its field transport position to a highway transport position.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIGS. 1 and 1A are plan views of portions of a rod weeder in which the principles of the present invention have been incorporated, FIG. 1 showing the right section and a portion of an intermediate section, and FIG. 1A showing the rest of the intermediate section shown in FIG. 1 and a portion of the left section.

FIG. 2 is a section taken along the lines 2—2 in FIG. 1A, the rod weeder being illustrated in its field transport position in full lines, and in its field-working position in broken lines.

FIG. 3 is a section taken along the lines 3—3 in FIG. 1 showing the manner in which the weeder rod is driven.

FIG. 5 is a perspective view illustrating a portion of the machine embodying the principles of this invention, this figure also illustrating a modified form of yieldable structure.

FIG. 6 is a perspective view illustrating the manner in which the forwardly extending implement hitch is secured to the frame of the rod weeder.

DESCRIPTION OF THE PREFERRED EMBODIMENT

Figure 4:
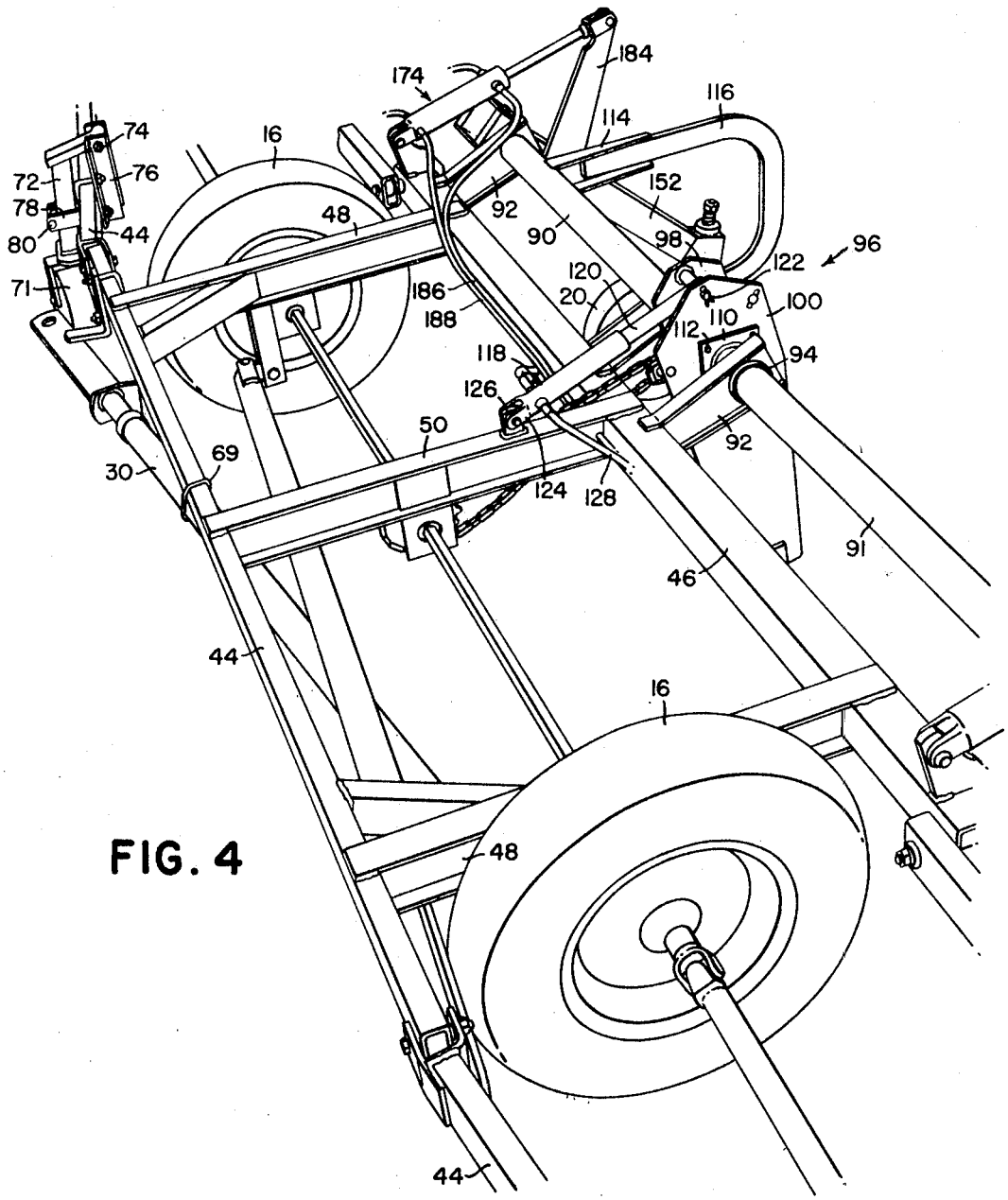
FIG. 4 is a perspective view of a portion of the rod weeder when it is in its highway transport position.

In the following description right-hand and left-hand reference is determined by standing to the rear of the rod weeder and facing the direction of travel.

Referring first to FIG. 1, the rod weeder of this invention has a frame formed from a plurality of subframes indicated generally at 10, 11 and 12. While only three subframes are illustrated in FIG. 1, it should be noted that more than three subframes could be employed in a rod weeder. The subframes are supported by front ground-engaging wheels 16a, 16b, 16c and 16d and rear gauge wheels 20a, 20b, 20c, and 20d. The front ground wheels 16 are fixed relative to the frame 10, 11, 12 and the rear gauge wheels 20 are movable relative to the frame in a manner which will be more fully set forth below.

Hitch means, indicated generally at 22, is secured to the forward end of the frame 10, 11, 12. In a three-section rod weeder, the hitch 22 will include right and left telescoping pole members 24, 26. Each of these pole members will be secured near the hingeline of two of the subsections. If additional sections are employed in the rod weeder, additional poles will be employed, these poles also running from a point near the adjoining line of two sections to a forward hitch plate 28. Each of the hitch poles 24, 26 includes a rear hollow member 30 and a forward member 32 which can telescope within the hollow member 30. The member 30 is apertured at its forward end and carries a pin 34 which can be disposed within a suitable aperture in the member 32 to hold the pole 24, 26 in its desired length. During field-working operations, the hitch poles 24, 26 are secured to a hitch plate 28 by hitch pins 36 which pass through a clevis 38 at the forward end of the pole and also through a corresponding aperture in the hitch plate 28. The forward end of the hitch plate 28 carries a clevis 40 which is secured to a tractor drawbar 42 in any suitable manner.

Each of the subframes includes a forward generally transversely extending frame member 44 and a rear transversely extending frame member 46. The frame members 44, 46 are interconnected by outer longitudinally extending frame members 48 and intermediate longitudinally extending frame members 50. The hitch poles 24, 26 are secured to the rod weeder frames 10, 11, 12 by structure illustrated in FIG. 6. To this end, outer frame member 48 carries depending mounting beams 52 which are welded to the frame member 48 and braced by a brace member 54. The lower end of the beams 52 carries a transversely extending pivot bolt 56. A swivel member 58 is journaled for rotational movement about the transversely extending pivot bolt 56 and is provided with a sleeve portion 60 at its forward end. A pair of spaced apart members 62 are welded to the rear of the hollow member 30, the spaced apart members 62 being apertured at their rear ends to receive a pin 64 which also passes through the sleeve portion 60. As can be seen from FIG. 6, the pin member 64 is normally vertically disposed so that the poles 24, 26 can be folded from the field position shown in FIG. 1 to the highway transport position shown in FIG. 4.

An endwise transport hitch 66 is provided and this hitch may be secured to the rear transverse frame member of one of the outer subframes 10, 12 in any conventional manner. The hitch 66 is provided with a clevis at its outer end to facilitate attachment to a tractor drawbar.

When the hitch poles 24, 26 are folded for transport, they may be held in their folded position by a tie rope or cable 69 in the manner shown in FIG. 4. Alternatively, they may be secured to a gusset plate 70 on the frame by a pin 70a.

Front transport wheels 71 are mounted on the transverse frame members 44 and can be swung from a ground-engaging position, shown in FIG. 4, upwards to a field-working position (shown in FIG. 2). These wheels (which are not shown in FIG. 1) are carried by a standard 72 whose upper end is rotatably journaled about a pivot bolt 74 carried by a pair of angle irons 76 clamped to the forward member 44. Forwardly extending straps 78 are apertured at their forward end to receive a locking pin 80 which may be used to hold the wheel 71 in its ground-engaging position as shown in FIG. 4.

To place the rod weeder in endwise transport position from the field transport position shown in full lines in FIG. 2, it is only necessary to swing the wheel assembly 71 downwardly until it engages the ground, to pull the rod weeder forwardly until the wheel assembly is disposed with the standard 72 between the straps 78 in such a manner that the pin 80 can be inserted. The rear gauge wheels are then turned 90° and locked in position by inserting a pin (not shown) through the aperture 81 in sleeve member 82 and the aperture 84 in spindle 86. The hitch 22 is then disconnected from the tractor and the hitch poles 24, 26 are disconnected from each other, telescoped inwardly, and folded to the position shown in FIG. 4. The tractor is then secured to the endwise transport hitch 66.

Each of the subframes 10, 11, 12 is provided with a rockshaft formed of right- and left-hand sections 90, 91, respectively. Each of the rockshaft sections is supported by a pair of rearwardly extending apertured frame members 92, each being provided with a cylindrical bearing 94 in which is rotatably disposed the rockshaft 90, 91. The two rockshaft sections 90, 91 are joined together by a boot, indicated generally at 96. Each boot has right and left upper members 98, 100, respectively, which are joined at their lower ends to a lower tubular member 102 in which is disposed a drive chain 104 and sprocket 106, the weeder rod 108 passing through an aperture of the same cross section as the weeder rod in the sprocket 106. To facilitate securement of the rockshaft sections 90 and 91 to the boot 96, the rockshafts are provided with facing flanges 110 which are apertured to receive fasteners 112. Welded or otherwise suitably secured to the outer end of each section 90, 91 is an attaching bracket 114 to which a weeder rod support in the form of a gooseneck pendant 116 may be secured. Means are provided to permit the weeder rod 108 to swing upwardly and rearwardly should an obstruction be encountered. To this end a retractable one-way hydraulic cylinder 118 is mounted with its upper or rod end 120 pivotally secured to a transversely extending pin 122 carried between the right and left members 98, 100 of the boot, the anchor end 124 of the cylinder assembly 118 being secured to a lug 126 carried by the intermediate longitudinally extending frame member 50.

The cylinder 118 is connected with a source of fluid under pressure. The source can be either an accumulator or the fluid outlet of a tractor having a closed center hydraulic system. If it is connected with the fluid outlet of a tractor, the fluid line 128 is connected with the fluid outlet of the tractor and also with a relief valve through which fluid may be dumped into the tractor reservoir. Thus, when an obstruction is encountered by the weeder rod, the fluid pressure in the line 128 is increased above that normally delivered by the tractor and the relief valve permits excess fluid to be delivered into the tractor reservoir in turn permitting the cylinder 118 to be compressed. After the obstruction has been passed, the pressure in the line 128 will be relieved and the tractor hydraulic pump will cause fluid to be introduced into the line 128 extending the cylinder 118 to its fully extended position shown in FIGS. 3 and 4. If a tractor having a closed center hydraulic system is not available, the fluid line 128 can be interconnected with an accumulator. In this type of system when an obstruction is encountered by the weeder rod, it will cause fluid to be displaced into the accumulator, and after the obstruction has been passed the over-pressurized fluid will be expelled from the accumulator back into the fluid line 128.

In FIG. 5 an alternative yieldable device is illustrated. This structure comprises a telescoping link assembly 129 having a barrel member 130 which can telescopically receive a rod member 131. The barrel member 130 is secured to the upper end of the boot by means of pivot pin 122 and the rod 131 is secured to the lug 126 by pin 125. A shear pin 132 passes through aligned apertures in members 130 and 131 to hold them in their extended position, the shear pin in turn being held in place by cotter pin 133. This form of device is used in soil where few obstructions are encountered, but when an obstruction is encountered, it is so designed that the pin 132 will shear before damage is incurred to the weeder rod 108.

The weeder rod 108 is driven from the ground wheels 16 by means of jackshafts 135, 136, and drive chain 138, the drive chain 138 passing over a sprocket 139 on the jackshaft and a sprocket 140 on the boot, sprocket 140 being concentric with a second sprocket 141 over which the drive chain 104 passes. The rockshaft 90, 91 is mounted to the boot so that the sprockets 140, 141 are concentric with the shaft 90, 91. The jackshaft 136 for section 11 which carries two wheels 16b, 16c is interconnected with both wheels by means of one-way ratcheting drives so that if the rod weeder is turned, the jackshaft will be driven by the wheel that moves the fastest. The jackshaft 135 which is associated with that section (either 10 or 12) having only one wheel is of telescoping construction and has a universal joint 142 which connects it through a stub shaft 144 with the wheel on the adjacent section. As in the case with the jackshaft 136, the jackshaft 135 is also driven from the right and left wheels through one-way ratcheting clutches.

While the drive chain 138 passes around its associated sprocket 140, the drive chain 104 only passes over its sprocket 141. To this end the chain 104 is held in place by idlers 146, 148, one of which (146) is adjustable to maintain the proper tension in the drive chain 104.

The gauge wheels are carried by a supporting structure indicated generally at 150, the gauge wheel supporting structure including an arm member 152 which is fixedly secured at its upper end to a C-shaped member 154 which carries bearing blocks 156. Each of the bearing blocks 156 is rotatably disposed about the associated rockshaft section 90, 91 and is held in place from lateral movement by rings 158 (FIG. 5) welded to the rockshaft section. The bearing blocks 156 are of a split construction having a lower semicircular portion 160 and an upper removable portion 162 which is held in place by bolts 164.

The lower end of the arm 152 has a sleeve portion 82 which receives the upwardly extending spindle 86 of the wheel assembly, the spindle 86 being in turn secured to a yoke 165 which carries an axle member 166. The upper end of the spindle is threaded and receives a nut 168 which bears against a spring 170 to hold a detent block 172 against the upper edge of the sleeve portion 82. The detent block 172 is keyed to the spindle 86 and normally holds the wheels 20 in the fore-and-aft position shown in FIG. 2, but permits it to caster when sufficient turning force is imposed upon the wheel. The gauge wheels 20 can be moved vertically to gauge the working depth of the rod 108 and also to raise the rod out of the ground to place the rod weeder in its field transport position. To this end, an extensible and retractable hydraulic cylinder 174 is provided, the anchor end 176 of the cylinder assembly being secured to an upstanding lug 178 mounted on the rear frame member 46. The rod end 180 of the cylinder assembly 174 is connected by means of a pivot bolt 182 to a mounting bracket 184 secured to the arm member 152. The cylinder assembly is connected by fluid lines 186 and 188 with a pair of outlets on a tractor, the outlets being alternately interconnectible with a source of fluid under pressure on a tractor and a fluid reservoir. By fully retracting the cylinder assemblies 174, the maximum working depth of the implement may be achieved. By partially extending the cylinders 174, the working depth of the weeder rod 108 may be reduced from the maximum. By fully extending the cylinders 174, the implement may be placed in its field transport position shown in FIG. 2.

The operation of the foregoing implement should be obvious from the above specification.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A rod weeder comprising: a frame adapted to be propelled forwardly over the ground, a transversely extending rockshaft journaled on said frame, a plurality of downwardly extending weeder rod supports fixed to and carried by said rockshaft, a weeder rod rotatably journaled in the lower end of said supports, one of said supports carrying means to drive said weeder rod, said one support being a drive boot having a drive chain disposed therein with the upper portion of the drive chain being disposed over sprocket means concentric with said rockshaft, drive wheel means mounted on and supporting the frame and coupled in a one-way driving relationship to said sprocket means, and yieldable hydraulic means interconnectng the upper end of one of said supports with said frame and operable to maintain the lower ends of said supports and the associated weeder rods in their normal ground-working position but operable to permit upward and rearward swinging movement when an obstruction is encountered.

2. The rod weeder set forth in claim 1 in which gauge wheel means are rotatably disposed about said rockshaft for vertical swinging movement, said gauge wheel means being interconnected with said frame by an extensible and retractable hydraulic cylinder means.

3. An implement comprising: a frame carried by forward ground-engaging wheels and adapted to be propelled forwardly over the ground, a transversely extending rockshaft journaled for rotation on said frame, a plurality of downwardly extending weeder rod supports fixed to and carried by said rockshaft, a weeder rod rotatably journaled in the lower ends of said supports, yieldable means operably interconnecting said rockshaft with said frame to normally prevent rotation of said rockshaft and hold said supports in their normal ground-working position but operable to permit rotation of the rockshaft and upwardly and rearwardly swinging movement of the supports if an obstruction should be encountered, a gauge wheel mounting arm having one end rotatably disposed about said rockshaft for vertical swinging movement, a gauge wheel carried by the other end of the arm, extensible and retractable means operably connected between the frame and arm to swing the arm about the rockshaft to thereby raise and lower the rockshaft and supports carried by the rockshaft by rotating the frame about the forward wheels, one of said supports being a drive boot having a drive chain disposed therein with the lower portion operatively coupled to the weeder rod and the upper portion disposed over sprocket means concentric with the rockshaft, and means coupling the forward wheels with the sprocket means in a one-way driving relationship.

4. The implement set forth in claim 3 in which said yieldable means comprises: a pair of telescoping links, said links normally being held in their extended position by a shear pin.

5. The implement set forth in claim 3 in which said yieldable means comprises: an extensible and retractable hydraulic cylinder assembly, said cylinder assembly normally being held in its extended position by fluid under pressure and operable to move towards its retracted position when said ground-engaging tool means encounters an obstruction.

6. The implement set forth in claim 3 in which a portion of said drive boot extends above the rockshaft, and said yieldable means extends between the upper end of said boot and the frame.

7. The implement set forth in claim 3 in which a forwardly extending hitch means is universally pivotally secured to said frame for movement about vertical and transversely extending axes, a transversely extending hitch means is carried by one end of said frame, and transport wheel means are mounted on a forward portion of the frame for movement between operative and inoperative positions whereby the rod weeder can be transported endwise by moving the transport wheels to an operative position and folding the forwardly extending hitch means to a transversely extending position.

8. A rod weeder comprising: an elongated transversely extending frame including a plurality of frame sections pivotally connected in end-to-end relationship for generally vertical movement with respect to each other; a plurality of forward ground-engaging wheels mounted on and supporting the frame sections; a transversely extending rockshaft rotatably journaled on a rear end portion of each frame section; a plurality of downwardly extending weeder rod supports fixed to and carried by each rockshaft; a weeder rod rotatably journaled in the lower end of the supports carried by each rockshaft; a yieldable hydraulic means operably interconnecting each rockshaft with its respective frame section to normally prevent rotation of the rockshafts and hold the supports in their normal ground-working position, each of the yieldable hydraulic means being operable to permit rotation of its respetive rockshaft and upwardly and rearwardly swinging movement of the supports carried thereby should an obstruction be encountered, a gauge wheel mounting arm rotatably journaled about each rockshaft for vertical swinging movement, a gauge wheel carried by each arm, and extensible and retractable hydraulic means operatively connected between each arm and its associated frame section to swing the arm about the rockshafts to thereby raise and lower the rockshafts and supports carried thereby by rocking the frame sections about the forward wheels.

References Cited
UNITED STATES PATENTS

| | | | |
|---|---|---|---|
| 885,563 | 4/1908 | Anderson | 172—271 |
| 2,900,031 | 8/1959 | Sorensen et al. | 172—44 |
| 3,042,122 | 7/1962 | Anderson | 172—265 |
| 3,115,940 | 12/1963 | Heinrich | 172—44 |
| 3,135,337 | 6/1964 | Morris | 172—44 |
| 3,321,031 | 5/1967 | Evans | 172—657 X |
| 3,360,053 | 12/1967 | Doepker | 172—44 |

ROBERT E. PULFREY, Primary Examiner

J. W. PETERSON, Assistant Examiner

U.S. Cl. X.R.

172—44, 265, 271, 398, 413